United States Patent
Wolczko

(10) Patent No.: US 12,204,907 B2
(45) Date of Patent: Jan. 21, 2025

(54) PROCESSOR SUPPORTING POSITION-INDEPENDENT ADDRESSING

(71) Applicant: Oracle International Corporation, Redwood City, CA (US)

(72) Inventor: Mario Wolczko, San Carlos, CA (US)

(73) Assignee: Oracle International Corporation, Redwood City, CA (US)

(*) Notice: Subject to any disclaimer, the term of this patent is extended or adjusted under 35 U.S.C. 154(b) by 18 days.

(21) Appl. No.: 17/335,945

(22) Filed: Jun. 1, 2021

(65) Prior Publication Data

US 2022/0382551 A1     Dec. 1, 2022

(51) Int. Cl.
*G06F 9/35*    (2018.01)
*G06F 9/30*    (2018.01)
*G06F 9/355*   (2018.01)

(52) U.S. Cl.
CPC .......... *G06F 9/355* (2013.01); *G06F 9/30043* (2013.01)

(58) Field of Classification Search
CPC .. G06F 9/355; G06F 9/30043; G06F 12/0238; G06F 2212/202; G06F 2212/72; G06F 8/434; G06F 12/0223; G06F 12/1009
See application file for complete search history.

(56) References Cited

U.S. PATENT DOCUMENTS

| | | | |
|---|---|---|---|
| 5,890,222 A * | 3/1999 | Agarwal | G06F 9/34 712/E9.023 |
| 6,345,276 B1 * | 2/2002 | Lee | G06F 12/0223 709/215 |
| 7,577,801 B1 * | 8/2009 | Tene | G06F 9/30043 711/163 |
| 9,940,229 B2 | 4/2018 | Shen et al. | |
| 10,108,402 B2 * | 10/2018 | Gopalakrishnan | G06F 8/423 |

(Continued)

OTHER PUBLICATIONS

"Complex instruction set computer" <https://en.wikipedia.org/w/index.php?title=Complex_instruction_set_computer&oldid=753638008> (Year: 2016).*

(Continued)

*Primary Examiner* — Andrew Caldwell
*Assistant Examiner* — Kasim Alli
(74) *Attorney, Agent, or Firm* — Robert C. Kowert; Kowert, Hood, Munyon, Rankin & Goetzel, P.C.

(57) ABSTRACT

A processor may implement position-independent memory addressing by providing load and store instructions that include position-independent addressing modes. A memory address may contain a normalized pointer, where the memory address stores a normalized memory address that, when added to an offset previously determined for the memory address, defines another memory address. The position-independent addressing mode may also support invalid memory addresses using a reserved value, where a load instruction providing the position-independent addressing mode may return a NULL value or generate an exception when determining that the stored normalized memory address is equal to the reserved value and where a store instruction providing the position-independent addressing mode may store the reserved value when determining that the memory address is an invalid or NULL memory address.

20 Claims, 12 Drawing Sheets

(56) References Cited

U.S. PATENT DOCUMENTS

| | | | |
|---|---|---|---|
| 10,802,984 | B2 | 10/2020 | Sanjeepan et al. |
| 10,929,132 | B1* | 2/2021 | Pawlowski ............... G06F 9/35 |
| 11,036,431 | B2* | 6/2021 | Aslot ................. G06F 12/1081 |
| 2002/0013866 | A1 | 1/2002 | Noeldner |
| 2009/0055630 | A1 | 2/2009 | Isshiki |
| 2014/0344602 | A1 | 11/2014 | Son |
| 2014/0379986 | A1 | 12/2014 | Troester |
| 2015/0169226 | A1 | 6/2015 | Shen |
| 2016/0378679 | A1 | 12/2016 | Cintra |
| 2017/0337137 | A1* | 11/2017 | Cintra ................. G06F 12/0292 |
| 2018/0189062 | A1* | 7/2018 | Baghsorkhi ........... G06F 9/3891 |
| 2020/0233670 | A1 | 7/2020 | Aleander |
| 2021/0026837 | A1 | 1/2021 | Talagala et al. |
| 2021/0096861 | A1 | 4/2021 | Wang |
| 2022/0035634 | A1* | 2/2022 | Lloyd ................. G06F 9/30043 |

OTHER PUBLICATIONS

"System call" <https://en.wikipedia.org/w/index.php?title=System_call&oldid=1018791369> (Year: 2021).*

Yuanchao Xu, Yan Solihin, and Xipeng Shen. MERR: Improving Security of Persistent Memory Objects via Efficient Memory Exposure Reduction and Randomization. In Proceedings of the Twenty-Fifth International Conference on ASPLOS. 987-1000 (Year: 2020).*

Bill Bridge, "NVM Direct Open Source Non-Volatile Memory API", dated 2015, pp. 1-24.

U.S. Appl. No. 17/246,482, filed Apr. 30, 2021, Mario Wolczko.

* cited by examiner

PROCESSOR SUPPORTING POSITION-INDEPENDENT ADDRESSING

BACKGROUND

Field of the Disclosure

This disclosure relates generally to computer hardware and software, and more particularly to systems and methods for implementing position-independent memory pointers to provide position-independent data structures.

Description of the Related Art

Traditionally, computer applications employ data structures that include pointers, that is variables containing memory addresses, to various other data structures, variables or fields. As the memory address space of an application is stable throughout execution, the application may rely on the locations of various data structures and use absolute memory locations for pointer storage. However, with the advent of non-volatile, or persistent, byte-addressable memory these assumptions of memory stability may be invalid as data stored in persistent data structures may outlast the lifetime of a single execution of an application.

Furthermore, persistent data structures may be implemented at different times and places, as will instantiations of those data structures with actual data. Therefore, there may arise situations in which two or more of these structures have to be operated upon by the same application at the same time in a way that could not have been anticipated when the data structures were instantiated. If these structures use traditional absolute memory addresses as pointers, the data structures may conflict in the choice of addresses, preventing simultaneous use. Therefore, what is needed is a new form of pointer that is position-independent and may be supported in a performant manner.

SUMMARY

Methods, techniques and systems for providing a processor implementing position-independent memory addressing are disclosed. These load and store instructions may load and store absolute memory addresses to and from specified locations of memory that may contain position-independent pointers. These position-independent pointers may include a normalized memory address that, when added to offsets previously determined for the specified locations of memory, defines the memory addresses to be loaded and stored. This position-independent addressing mode may also support invalid memory addresses using a reserved value, where a load instruction providing the position-independent addressing mode may return a NULL value or generate an exception when determining that the stored normalized memory address is equal to the reserved value and where a store instruction providing the position-independent addressing mode may store the reserved value when determining that the memory address is an invalid or NULL memory address.

Figure 1:
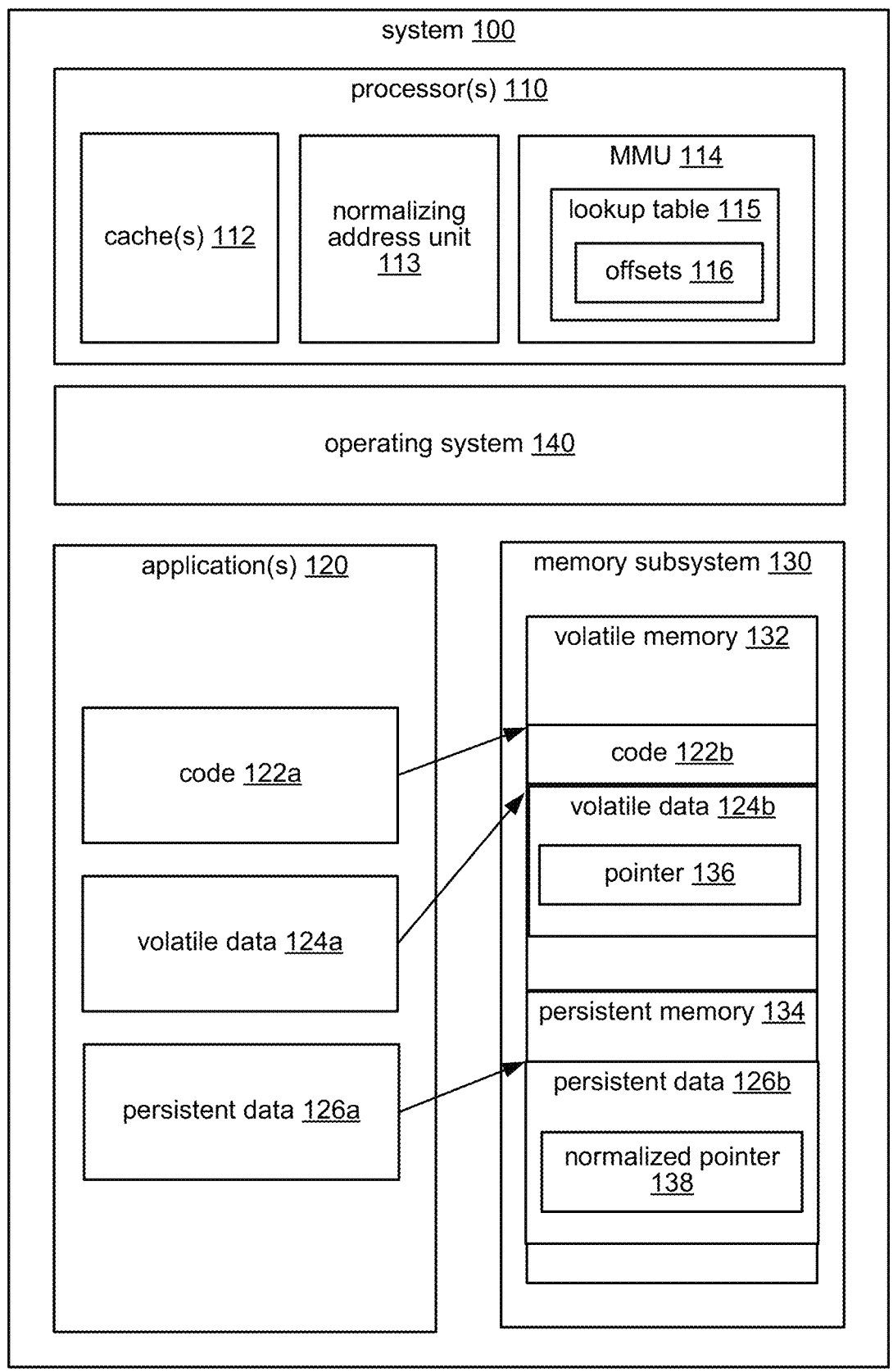
FIG. 1 is a block diagram illustrating a system including a processor supporting position-independent addressing modes in various embodiments.

While the disclosure is described herein by way of example for several embodiments and illustrative drawings, those skilled in the art will recognize that the disclosure is not limited to embodiments or drawings described. It should be understood that the drawings and detailed description hereto are not intended to limit the disclosure to the particular form disclosed, but on the contrary, the disclosure is to cover all modifications, equivalents and alternatives falling within the spirit and scope as defined by the appended claims. Any headings used herein are for organizational purposes only and are not meant to limit the scope of the description or the claims. As used herein, the word "may" is used in a permissive sense (i.e., meaning having the potential to) rather than the mandatory sense (i.e. meaning must). Similarly, the words "include", "including", and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. § 112(f) interpretation for that unit/circuit/component.

This specification includes references to "one embodiment" or "an embodiment." The appearances of the phrases "in one embodiment" or "in an embodiment" do not necessarily refer to the same embodiment, although embodiments that include any combination of the features are generally contemplated, unless expressly disclaimed herein. Particular features, structures, or characteristics may be combined in any suitable manner consistent with this disclosure.

DETAILED DESCRIPTION OF EMBODIMENTS

Traditionally, computer applications employ data structures that include pointers, that is variables containing memory addresses, to various other data structures, variables or fields. As the memory address space of an application is stable throughout execution, the application may rely on the locations of various data structures and use absolute memory locations in pointer storage.

However, with the advent of non-volatile, or persistent, byte-addressable memory (PMEM), such as Intel Optane Persistent Memory and non-volatile RAM (NVRAM), these assumptions of memory stability may be invalid as data stored in persistent data structures may outlast the lifetime of a single execution of an application. While consecutive invocations of a same application may result in consistent memory addressing, varying data addresses is an important technique to combat certain kinds of malware (e.g. Address Space Layout Randomization); Operating Systems generally reserve the right to map data at different addresses across invocations making addressing of persistent data structures with absolute pointer addresses problematic.

Furthermore, persistent data structures may be created at different times and places, as will instantiations of those data structures with actual data. Therefore, there may arise situations in which two or more of these structures have to be operated upon by the same application at the same time in a way that could not have been anticipated when any of the data structures were instantiated. If these structures use traditional absolute memory addresses as pointers, the data structures may conflict in the choice of addresses, preventing simultaneous use.

One approach is to constrain persistent data structures to use only normalized pointers. A normalized pointer stored at address A which points to address B may store the value B−C, where C is an offset determined during the allocation of memory containing address A. When accessed, the value stored in the pointer is then added another offset C' to yield the address of the target. Offsets C and C' may be identical or they may be different, depending on whether the storing and loading operations are performed by software using the same or different address mappings.

Such an approach may be implemented in software providing performance is close to that of traditional absolute addressing. Performance, however, may be dependent on how well the processor microarchitecture used can hide extra additions and subtractions. On some systems, e.g., Intel x86, this may be accomplished using available complex addressing modes.

However, applications commonly use a special memory address value, known as a NULL value or NULL pointer, to indicate the existence of an invalid memory address. Therefore, memory pointers, in addition to referencing other memory locations, may assume a value which indicates that no valid memory address is stored. Most systems use zero as a NULL pointer value and arrange for a region of memory including the zero address to be protected such that if a NULL pointer is used to access memory (which is an error) a fault or processor exception may be generated without requiring extra instructions to explicitly test for the NULL value. Therefore, to provide complete support for position-independent pointers a mechanism to support NULL pointers must also be provided.

For many languages, for example Java™, a pointer may only point to an object and not another pointer. Therefore, zero can be used as a reserved value indicating an invalid address since a pointer cannot point to itself. However, in C and related languages a pointer may point to another pointer or to itself, thus zero cannot be used as a reserved value indicating an invalid address. Any number of possible solutions may be envisioned. For example, a possible alternative is to use a normalized address value of 1 to represent a NULL pointer, as modern computing platforms require multiple bytes to store a pointer and pointing into the middle of a pointer would never be useful. In another example, an offset may be chosen such that valid normalized memory addresses may never have a zero value, allowing zero to be used as a reserved value indicating an invalid address. These various examples, however, are not intended to be limiting and various choices of reserved normalized address values and offsets may be envisioned.

Regardless of choice of reserved normalized address value, however, performance of pointer accesses will be reduced as NULL pointers must be explicitly tested on both access and update. Implemented in software, this approach will result in larger application sizes and/or slower execution because of extra instructions required regardless of whether these operations are added inline or included are subroutines.

Various embodiments of processors implementing position-independent addressing are disclosed herein. Using position-independent addressing, normalized pointers may be immediately converted to absolute addresses when loaded and only converted to normalized addresses when stored. Using position-independent addressing, normalized pointers may be supported without further changes to existing software. Furthermore, full support for existing memory addressing techniques, including the use of NULL pointers, may be provided without impact to application performance or code size.

FIG. 1 is a block diagram illustrating a system including processors supporting position-independent addressing modes according to various embodiments. A system 100 may include one or more processors 110 implementing position-independent addressing modes. These processors may each include one or more caches 112 and a memory management unit (MMU) 114 coupling the processors to a memory subsystem 130. MMU 114 may include one or more hardware lookup tables 115 that provide offsets 116.

In addition, the processors may each include a normalizing address unit 113, in various embodiments. In some embodiments, the normalizing address unit 113 may be a stand-alone component of the processor while in other embodiments, the normalizing address unit 113 may be integrated as part of other components of the processor, such as a cache 112, an MMU 114 or various arithmetic logic units of the processor (not shown). These various examples, however, are not intended to be limiting and the normalizing address unit 113 may be incorporated into the process in any manner. The normalizing address unit 113 is discussed in further detail below in FIG. 2.

In some embodiments, the normalizing address unit 113 may operate on virtual memory addresses that may be mapped to physical memory using the respective memory management units (MMUs) 114 of the processor(s) 110. In these embodiments the memory addresses used in pointers 136 and 138 may therefore be virtual memory addresses. In other embodiments, however, the memory addresses used in pointers 136 and 138 may be physical memory addresses.

The memory subsystem may further include volatile memory 132 and persistent memory 134. An exemplary system 100 is discussed in further detail below in FIG. 7.

The normalizing address unit 113 may use offsets for memory addresses mapped to particular locations in memory, either volatile memory 132 or persistent memory 134, in the conversion between normalized pointers and absolute pointers. These offsets may be determined by operating system software 140 when initializing, or executing, applications 120. As memory storing pointer values is requested by applications 120, either during initialization or during execution, a range of memory for the requested memory may be established and page table entries (not shown) or other data structures may be initialized by the operating system 140 in the MMU 114. Included in these page table entries or other data structures are offset values for the memory usable to support position-independent addressing modes, the offset values determined during the allocation of memory space to the requested memory. In the event that the memory requested contains volatile data 124 stored in volatile memory 132, these offsets may be set to a zero value, whereas in the event that the memory requested contains persistent data 126 stored in persistent memory 134, these offsets may be determined based on the memory address assigned to the requested persistent memory.

The system 100 may execute one or more applications 120 which may employ persistent memory 134 to store persistent data structures as part of persistent data 126a. The application(s) 120 may include separate code 122a and volatile data 124a that may be stored in non-persistent, or volatile, memory 132. During application initialization, volatile code and data, such as code 122a and volatile data 124a, may be assigned specific addresses in the memory subsystem 130 and may then be initialized. For this reason, memory pointers, such as pointer 136, may be configured to directly store absolute memory addresses, as these addresses may remain consistent for the duration of application execution. To configure these pointers 136 to directly store absolute memory addresses, offset values determined for these pointers may be set to zero and stored in page table entries in the MMU 114 in some embodiments.

Persistent data 126a stored in persistent memory 134, however, may be preserved across multiple executions of a single application. As such, an application may not initialize such persistent data if that data has been initialized during a previous execution. However, current memory subsystem 130 configuration and application 120 configuration may be inconsistent for different executions of a given application 120, leading to memory addresses of persistent data becoming inconsistent over time. This may be caused by the operating system 140 varying mappings of data to different addresses across application invocations to combat certain kinds of malware or it may be due to various persistent data structures being created at different times and by different applications. Therefore, it may be possible for two or more of these structures to have conflicts in the choice of addresses. As a result, pointers in persistent data 126a structures may implement normalized pointers 138 rather than absolute pointers 136 as used in volatile data structures 124a. To configure these pointers 138 to implement normalized pointers, offset values may be determined for these pointers based on addresses for memory containing these pointers and stored in page table entries in the MMU 114 in some embodiments.

Code 122a of the application 120 may be mapped to a region of volatile memory 132 of the memory subsystem 130 as shown in code 122b. Similarly, volatile data 124a of the application 120 may be mapped to a region of volatile memory 132 of the memory subsystem 130 as shown in code 124b and persistent data 126a of the application 120 may be mapped to a region of volatile memory 132 of the memory subsystem 130 as shown in code 126b. In some embodiments these mappings may be performed by respective memory management units (MMUs) 114 of the processor(s) 110.

Figure 2:
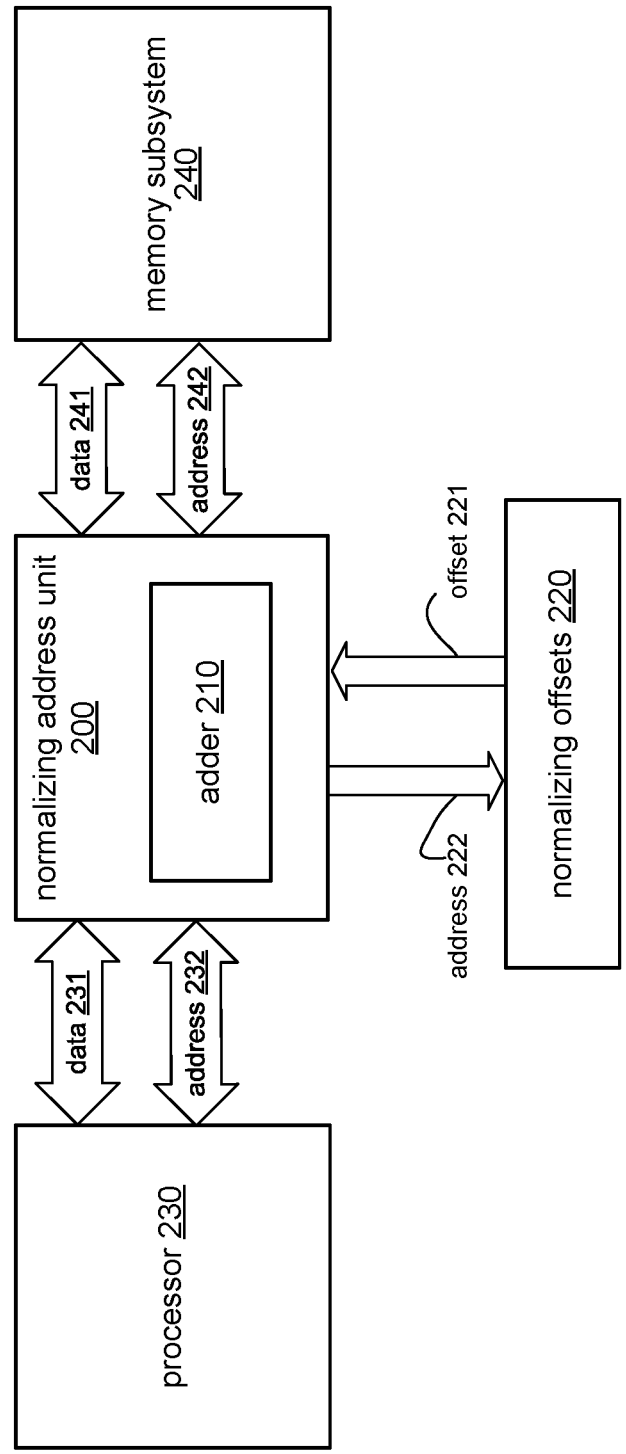
FIG. 2 is a block diagram illustrating an embodiment implementing a normalizing address unit that supports position-independent addressing.

FIG. 2 is a block diagram illustrating an embodiment implementing a normalizing address unit that supports position-independent addressing. A normalizing address unit 200, such as the normalizing address unit 113 as shown in FIG. 1, may connect a processor 230 to a memory subsystem 240 while transparently normalizing and de-normalizing memory addresses communicated over data buses 231 and 241. Memory locations storing pointers may be identified using memory addresses communicated over address buses 232 and 242, where the processor may indicate memory accesses to pointer values by asserting a true value on the pointer signal 233 while indicating memory accesses to non-pointer values by asserting a false value on the pointer signal 233.

Various caches, such as the caches 112 as shown in FIG. 1, may reside between the processor 230, normalizing address unit 200 and memory subsystem 240. In the event that a cache resides between the processor 230 and normalizing address unit 200, the cache may preserve the signal 233. In some embodiments, this preserving may be implemented by including the signal 233 as an additional address line communicated over the address bus 232.

The normalizing address unit 200 may contain an adder 210 usable to normalize and de-normalize memory addresses. When a memory access of a pointer is performed, as indicated by a true value asserted on the signal 233, the normalizing address unit 200 may activate the adder 210 to add or subtract an offset 221 obtained from normalizing offset 220 using the address of the access communicated over the address bus 222.

In some embodiments, the normalizing offsets 220 may be implemented in lookup tables such as page table (not shown) or other data structures of an MMU such as the MMU 114 as shown in FIG. 1. A common offset value for multiple normalized pointers may thus be shared for normalized pointers stored on a same memory page. In other embodiments, the normalizing offsets 220 may be implemented as a hardware lookup table or data structure, for example using a content addressable memory or a ternary content addressable memory. Using a content addressable memory, a default value may be defined returning a zero value for any address not found, allowing for the bypassing of the normalizing and de-normalizing operations for pointers, such as the absolute pointers 136 as shown in FIG. 1, which do not store normalized addresses. In still other embodiments, the normalizing offsets 220 may not store pre-determined offsets at all, but may simply reflect the address received over address bus 222 as the offset 221. While embodiments using this form of normalizing offsets 220 may result in all pointers being normalized and de-normalized, in some embodiments this may result in proper functioning of all memory pointers. These various examples of normalizing offsets 220, however, are not intended to be limiting and any number of implementations may be envisioned.

When activated by a true value asserted on signal 233, the normalizing address unit may communicate absolute pointers with the processor 230 over data bus 231 while communicating normalized pointers with the memory subsystem 240 over data bus 241.

Figure 3:
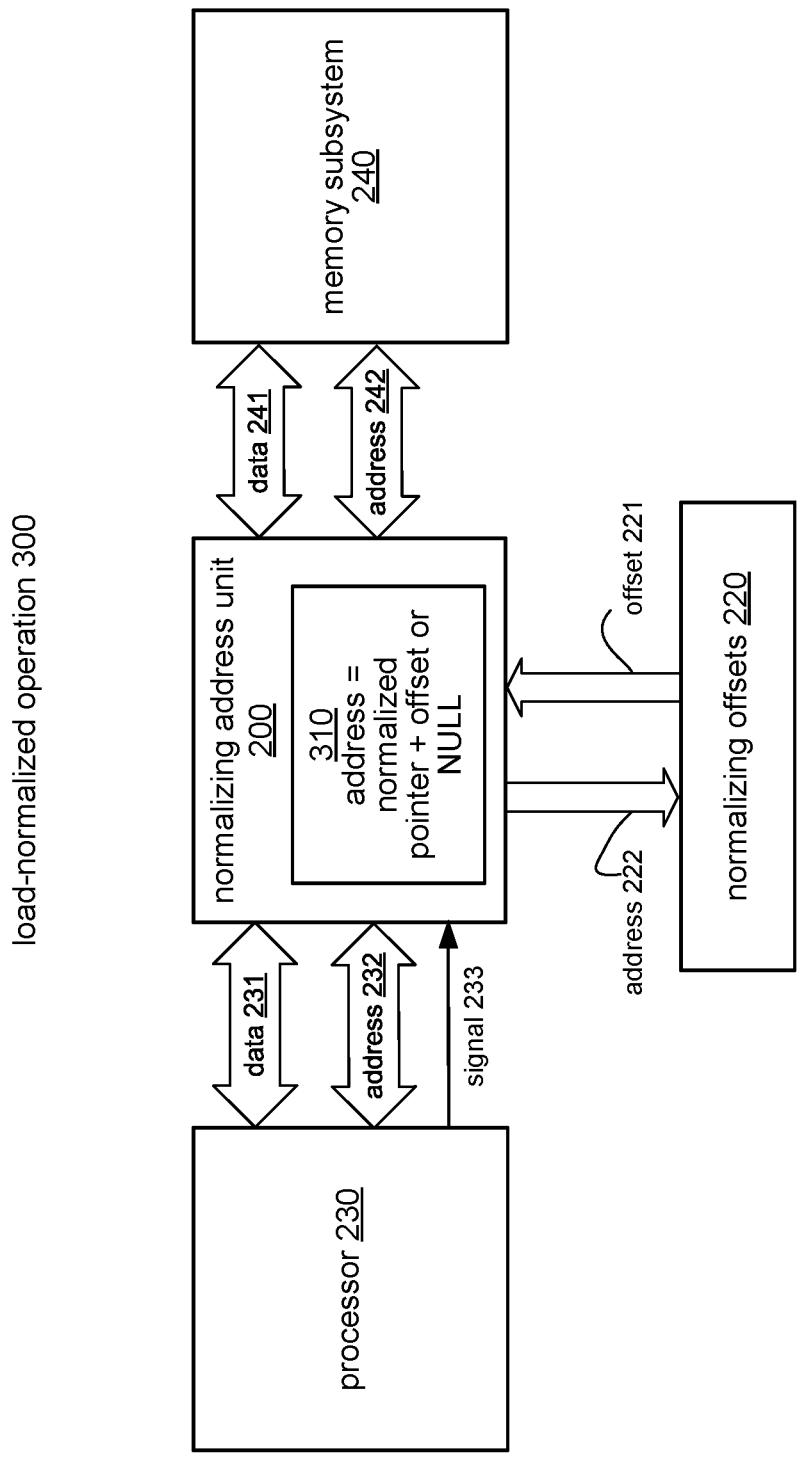
FIG. 3 is a block diagram illustrating an embodiment implementing a load-normalized operation that supports position-independent addressing.

FIG. 3 is a block diagram illustrating an embodiment implementing a load-normalized operation that supports position-independent addressing. This load-normalized instruction may be implemented, for example, on the processor(s) 110 as shown in FIG. 1 to support position-independent pointers such as normalized pointer 138 shown in FIG. 1.

A normalizing address unit 200, such as the normalizing address unit 113 as shown in FIG. 1, may receive an address from a processor 230 over address bus 232 and additionally receive a true value over signal 233, indicating a load of a normalized pointer in some embodiments. The address received on address bus 232 may be forwarded by the normalizing address unit 200 onto address buses 242 and 222 in some embodiments.

The normalizing address unit 200 may then receive a normalized pointer from the memory subsystem 240 over data bus 241 and an offset 221 associated with the normalized pointer from the normalized offsets 220 in some embodiments. The normalizing address unit 200 may then calculate an absolute address 310 by adding the received normalized pointer and offset and send the calculated absolute address to the processor 230 over the data bus 231 in some embodiments. In some embodiments, the calculated absolute address may be performed responsive to determining that the normalized pointer is valid. Otherwise, the calculated absolute address may be set to an invalid memory address value.

Figure 4:
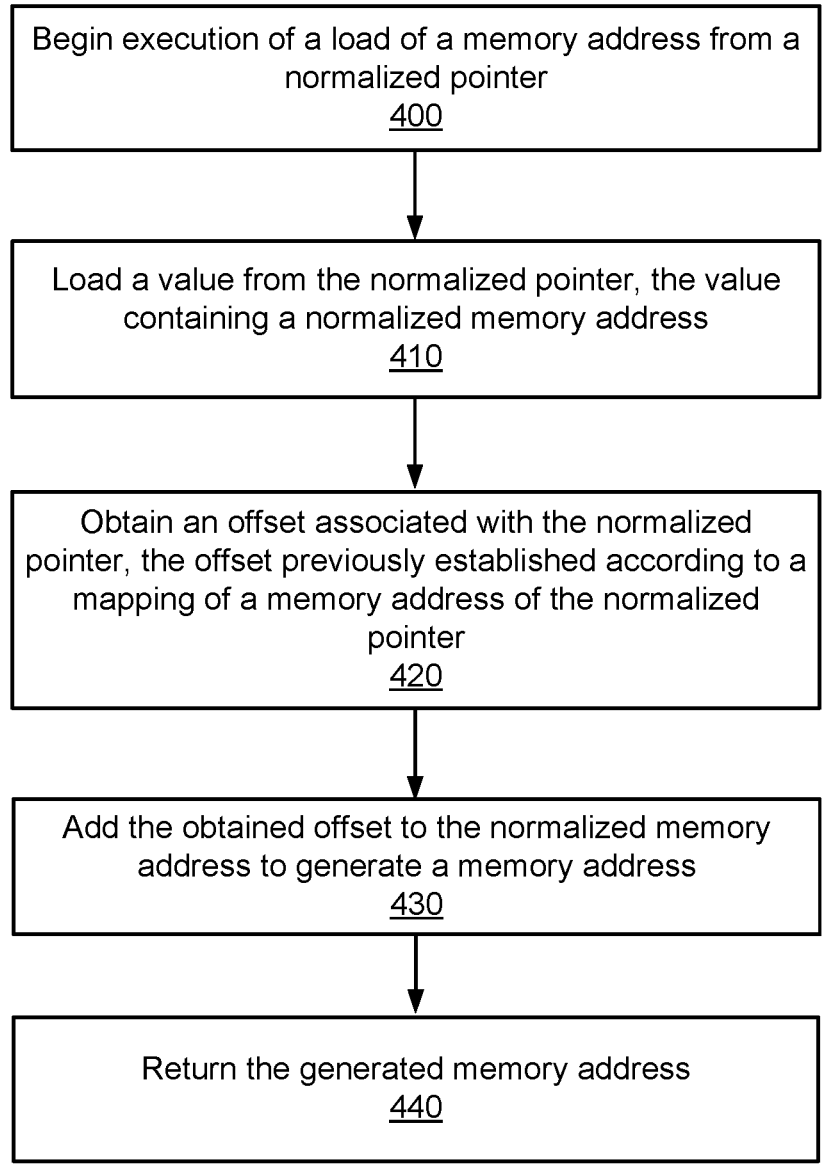
FIG. 4 is a flow diagram illustrating an embodiment of load-normalized operation that supports position-independent addressing.

FIG. 4 is a flow diagram illustrating an embodiment of load-normalized operation that supports position-independent addressing. The process begins at step 400 where a processor providing position-independent addressing, such as the processor(s) 110 as shown in FIG. 1, begins execution of a load instruction, such as the load-normalized operation 300 as shown in FIG. 3, with the load operation loading a memory address from a normalized pointer, such as the normalized pointer 138 as shown in FIG. 1. Memory addresses supported by the load operation may be virtual memory addresses in some embodiments while in other embodiments they may be physical memory addresses.

As shown in step 410, a normalized memory address may be loaded from the normalized pointer, in some embodiments. Then, in step 420, an offset associated with the normalized pointer, such as the offset 221 as shown in FIG. 3, may be obtained, where the offset may be previously established according to a mapping of the normalized pointer to the memory.

As shown in step 430, the obtained offset value may then be added to the normalized memory address to generate an absolute memory address. Once an absolute memory address has been generated, the absolute memory address may be returned, as shown in 440, in some embodiments.

Figure 5:
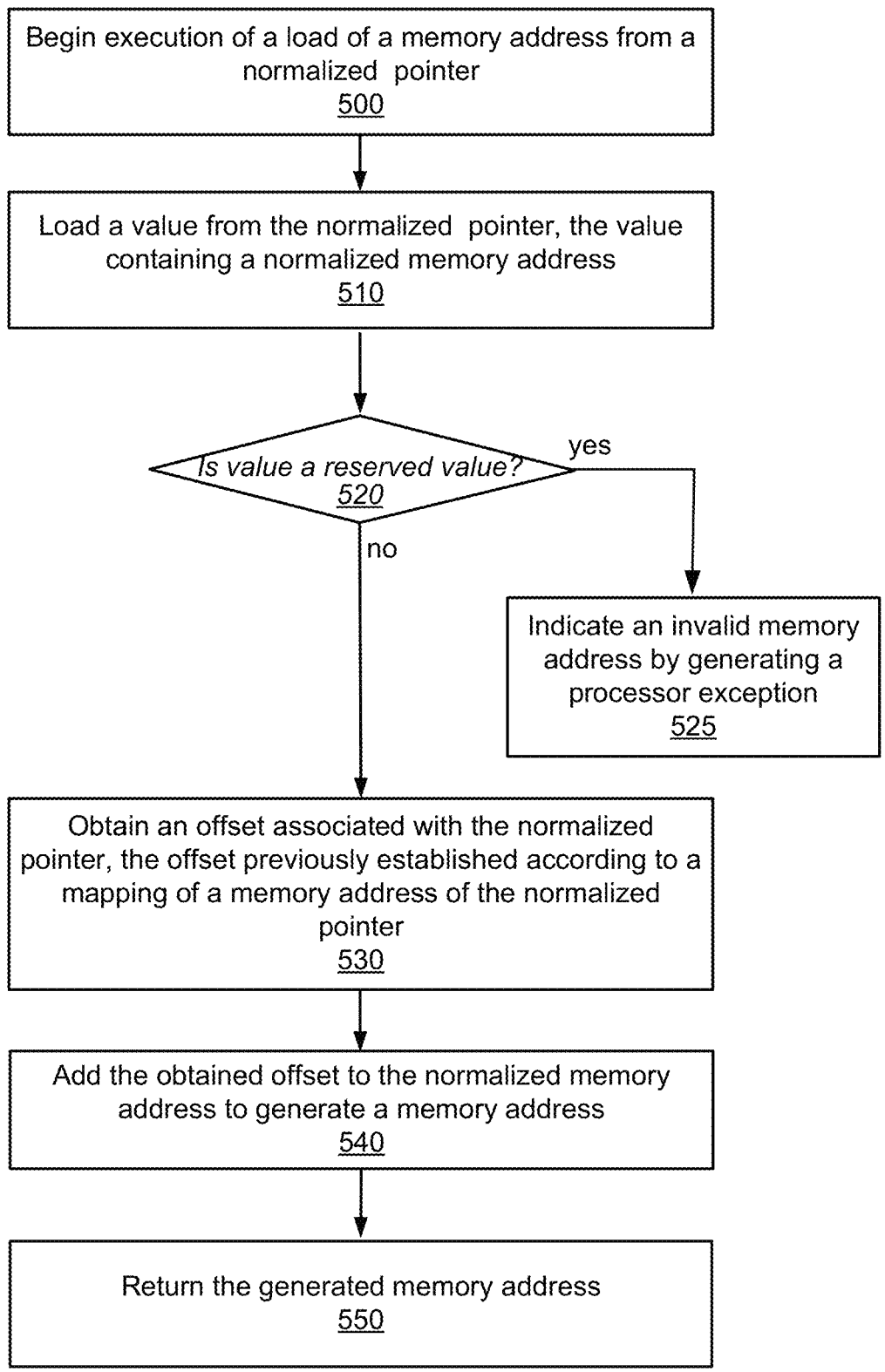
FIG. 5 is a flow diagram illustrating an embodiment of load-normalized operation that supports position-independent addressing with invalid address support.

FIG. 5 is a flow diagram illustrating an embodiment of load-normalized operation that supports position-independent addressing with invalid address support. The process begins at step 500 where a processor providing position-independent addressing, such as the processor(s) 110 as shown in FIG. 1, begins execution of a load instruction, such as the load-normalized operation 300 as shown in FIG. 3, with the load operation loading a memory address from a normalized pointer, such as the normalized pointer 138 as shown in FIG. 1. Memory addresses supported by the load operation may be virtual memory addresses in some embodiments while in other embodiments they may be physical memory addresses.

As shown in step 510, a normalized memory address may be loaded from the normalized pointer, in some embodiments. Then, in step 520, the normalized memory address may be compared to a reserved value indicating an invalid normalized memory address. If the normalized memory address is equal to the reserved value indicating an invalid normalized memory address, as shown in the positive exit from 520, an indication of an invalid memory address may be signaled by generating an error signal or processor exception, as shown in 525, in some embodiments. If, however, the normalized memory address is not equal to the reserved value indicating an invalid normalized memory address, as shown in the negative exit from 520, the process may advance to step 530.

As shown in 530, an offset associated with the normalized pointer, such as the offset 221 as shown in FIG. 3, may be obtained, where the offset may be previously established according to a mapping of the normalized pointer to the memory.

As shown in step 540, the obtained offset value may then be added to the normalized memory address to generate an absolute memory address. Once an absolute memory address has been generated, the absolute memory address may be returned, as shown in 550, in some embodiments.

Figure 6:
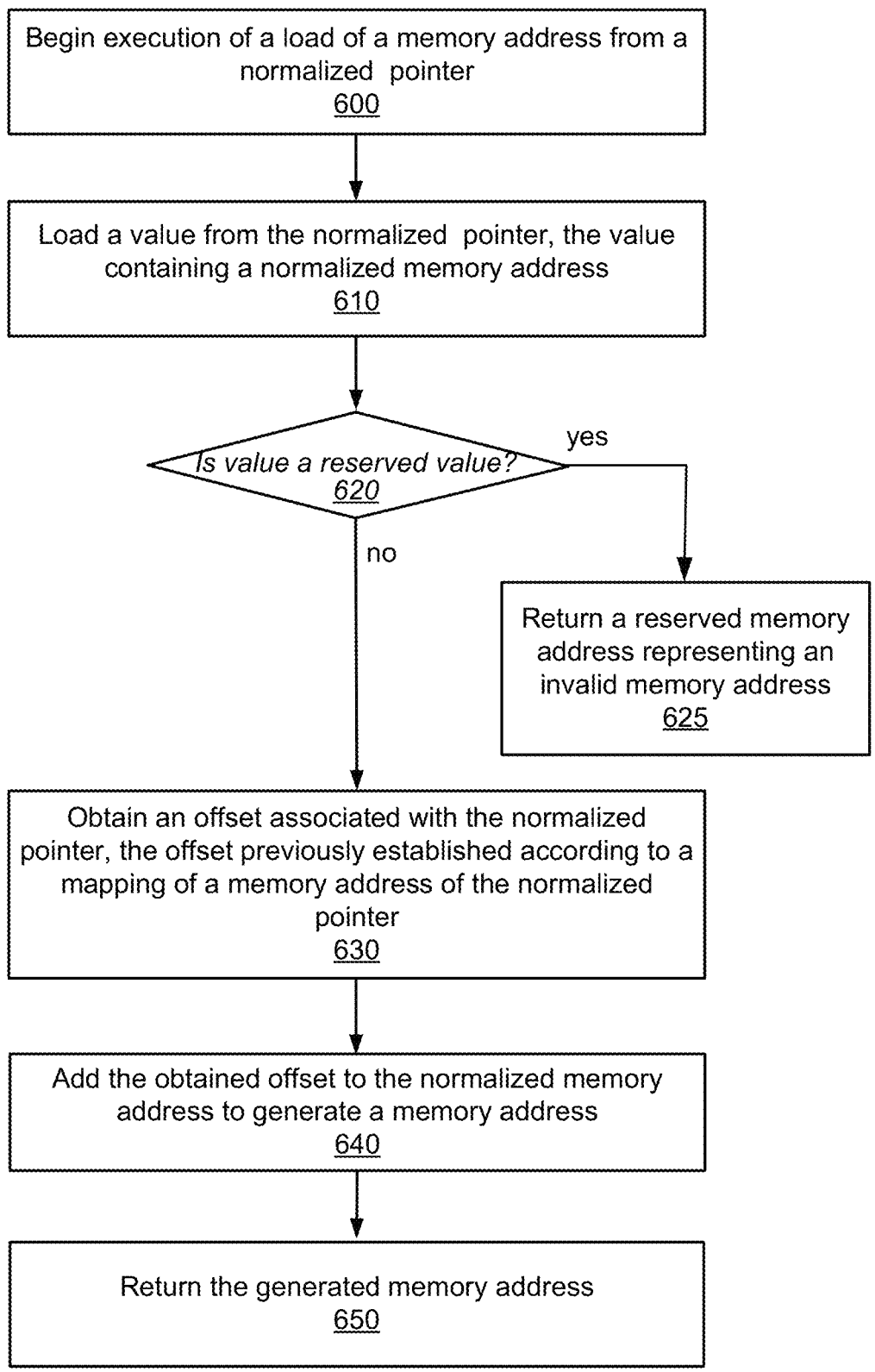
FIG. 6 is a flow diagram illustrating another embodiment of load-normalized operation that supports position-independent addressing with invalid address support.

FIG. 6 is a flow diagram illustrating another embodiment of load-normalized operation that supports position-independent addressing with invalid address support. The process begins at step 600 where a processor providing position-independent addressing, such as the processor(s) 110 as shown in FIG. 1, begins execution of a load instruction, such as the load-normalized operation 300 as shown in FIG. 3, with the load operation loading a memory address from a normalized pointer, such as the normalized pointer 138 as shown in FIG. 1. Memory addresses supported by the load operation may be virtual memory addresses in some embodiments while in other embodiments they may be physical memory addresses.

As shown in step 610, a normalized memory address may be loaded from the normalized pointer, in some embodiments. Then, in step 620, the normalized memory address may be compared to a reserved value indicating an invalid normalized memory address. If the normalized memory address is equal to the reserved value indicating an invalid normalized memory address, as shown in the positive exit from 620, a reserved memory address representing an invalid memory address, such as a NULL or zero address, may be returned, as shown in 625, in some embodiments. If, however, the normalized memory address is not equal to the reserved value indicating an invalid normalized memory address, as shown in the negative exit from 620, the process may advance to step 630.

As shown in 630, an offset associated with the normalized pointer, such as the offset 221 as shown in FIG. 3, may be obtained, where the offset may be previously established according to a mapping of the normalized pointer to the memory.

As shown in step 640, the obtained offset value may then be added to the normalized memory address to generate an absolute memory address. Once an absolute memory address has been generated, the absolute memory address may be returned, as shown in 650, in some embodiments.

Figure 7:
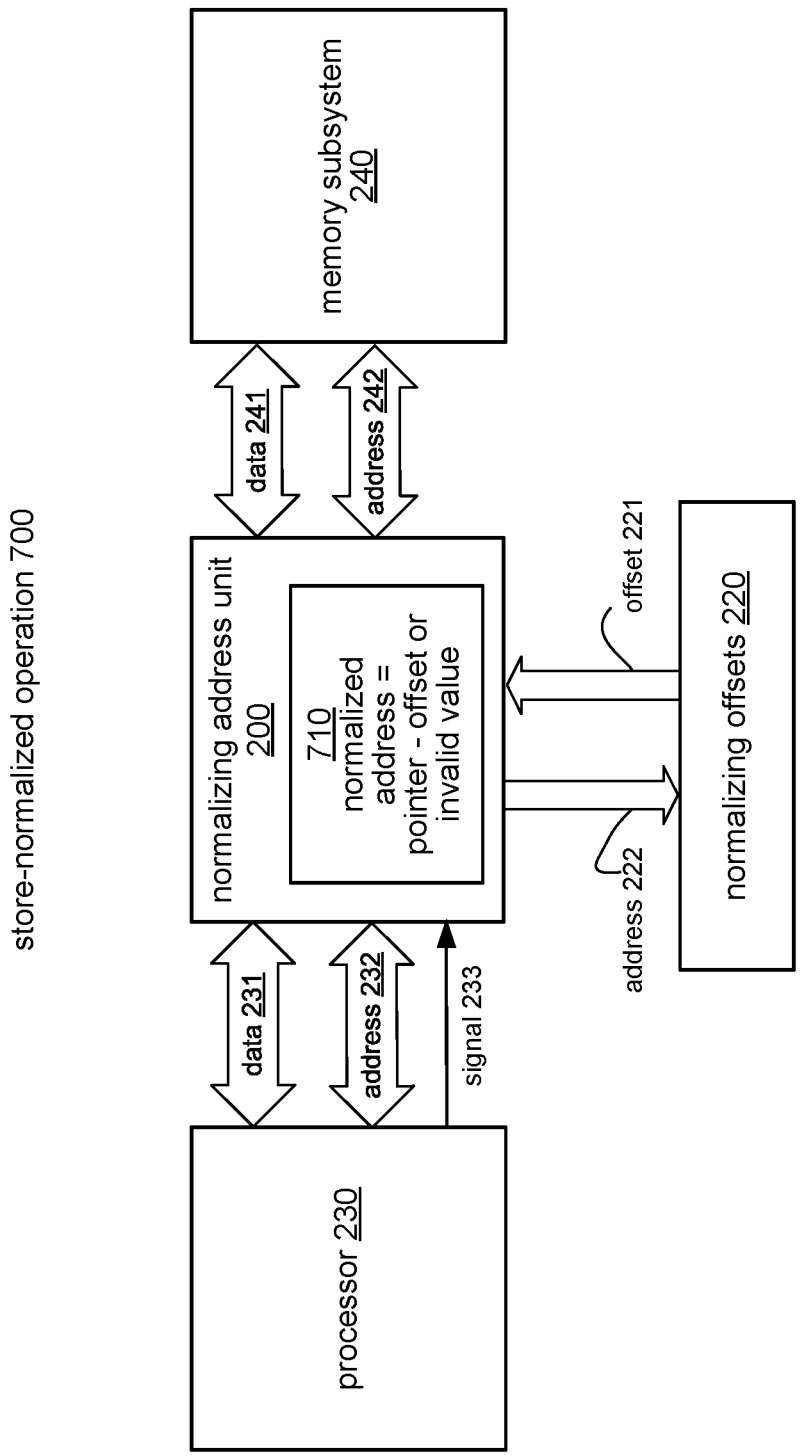
FIG. 7 is a block diagram illustrating an embodiment implementing a store-normalized operation that supports position-independent addressing.

FIG. 7 is a block diagram illustrating an embodiment implementing a store-normalized operation that supports position-independent addressing. This store-normalized instruction may be implemented, for example, on the processor(s) 110 as shown in FIG. 1 to support position-independent pointers such as normalized pointer 138 shown in FIG. 1.

A normalizing address unit 200, such as the normalizing address unit 113 as shown in FIG. 1, may receive an address and an absolute address from a processor 230 over address bus 232 and data bus 231 respectively and additionally receive a true value over signal 233, indicating a store of a normalized pointer in some embodiments. The address received on address bus 232 may be forwarded by the normalizing address unit 200 onto address buses 242 and 222 in some embodiments.

The normalizing address unit 200 may then receive an offset 221 associated with the received address from the normalized offsets 220 in some embodiments. The normalizing address unit 200 may then calculate a normalized address 710 by subtracting the offset from the received absolute address and send the calculated normalized address to the memory subsystem 240 over the data bus 241 in some embodiments. In some embodiments, the calculated normalized address may be performed responsive to determining that the received absolute address is valid. Otherwise, the calculated normalized address may be set to an invalid value.

Figure 8:
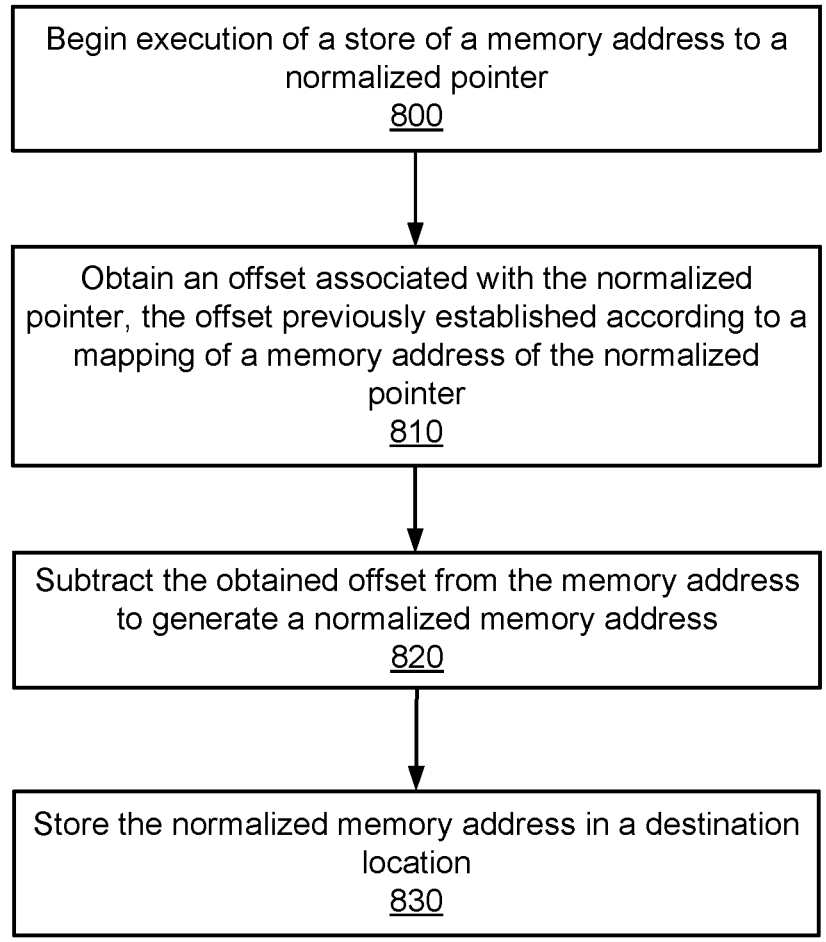
FIG. 8 is a flow diagram illustrating an embodiment of store-normalized operation that supports position-independent addressing.

FIG. 8 is a flow diagram illustrating an embodiment of store-normalized operation that supports position-independent addressing. The process begins at step 800 where a processor providing position-independent addressing, such as the processor(s) 110 as shown in FIG. 1, begins execution of a store operation, such as the store-normalized operation 700 as shown in FIG. 7, with the store operation storing a normalized pointer to a destination memory address, such as the normalized pointer 138 as shown in FIG. 1.

As shown in step 810, an offset value associated with the normalized pointer address may be obtained, where the offset value may be previously established according to a mapping of the normalized pointer to the memory, in some embodiments.

As shown in step 820, a normalized memory address may then be generated by subtracting the obtained offset value from the provided memory address, in some embodiments. Then, in step 830, the normalized memory address may be stored in normalized pointer. In some embodiments, the processor providing position-independent addressing may additionally signal an invalid store operation by generating an error signal or processor exception in the event that the destination memory address is equal to the reserved value indicating an invalid normalized memory address.

Figure 9:
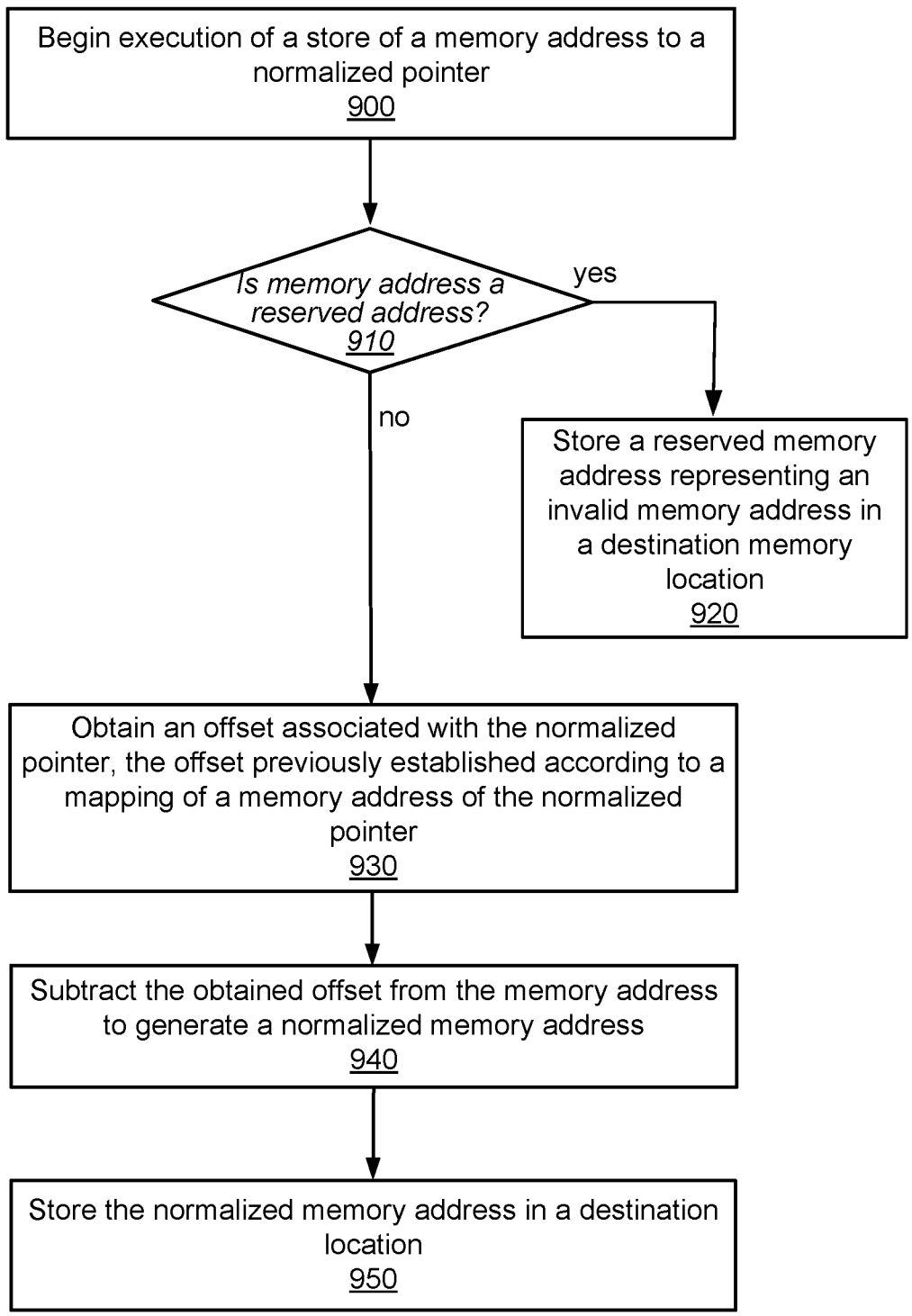
FIG. 9 is a flow diagram illustrating an embodiment of store-normalized operation that supports position-independent addressing with invalid address support.

FIG. 9 is a flow diagram illustrating an embodiment of store-normalized operation that supports position-independent addressing with invalid address support. The process begins at step 900 where a processor providing position-independent addressing, such as the processor(s) 110 as shown in FIG. 1, begins execution of a store operation, such as the store-normalized operation 700 as shown in FIG. 7, with the store operation storing a normalized pointer to a destination memory address, such as the normalized pointer 138 as shown in FIG. 1.

As shown in step 910, the address operand may be compared to a reserved memory address value indicating an invalid memory location in some embodiments. In some embodiments, this reserved memory address value indicating an invalid memory location may be included as part of processor instruction set architecture (ISA) while in other embodiments the value may not be predefined by may instead be provided as an additional argument of the store-normalized instruction 700. These examples, however, are not intended to be limiting and any number of arrangements for these reserved values may be envisioned.

If the address operand is equal to the reserved memory address value indicating an invalid memory location, as shown in the positive exit from 910, the processor may indicate that the normalized pointer defines an invalid memory address by storing a reserved normalized memory address indicating an invalid memory location in the normalized pointer, as shown in 920, in some embodiments. In some embodiments, this reserved normalized memory address may be included as part of processor instruction set architecture (ISA) while in other embodiments the value may not be predefined by may instead be provided as an additional argument of the store-normalized operation 700. These examples, however, are not intended to be limiting and any number of arrangements for these reserved values may be envisioned.

If, however, the address operand is not equal to the reserved normalized memory address, as shown by a negative exit from 910, then as shown in step 930, an offset value associated with the normalized pointer address may be obtained, where the offset value may be previously established according to a mapping of the normalized pointer to the memory, in some embodiments.

As shown in step 940, a normalized memory address may then be generated by subtracting the obtained offset value from the provided memory address, in some embodiments. Then, in step 950, the normalized memory address may be stored in normalized pointer. In some embodiments, the processor providing position-independent addressing may additionally signal an invalid store operation by generating an error signal or processor exception in the event that the destination memory address is equal to the reserved value indicating an invalid normalized memory address.

Figure 10:
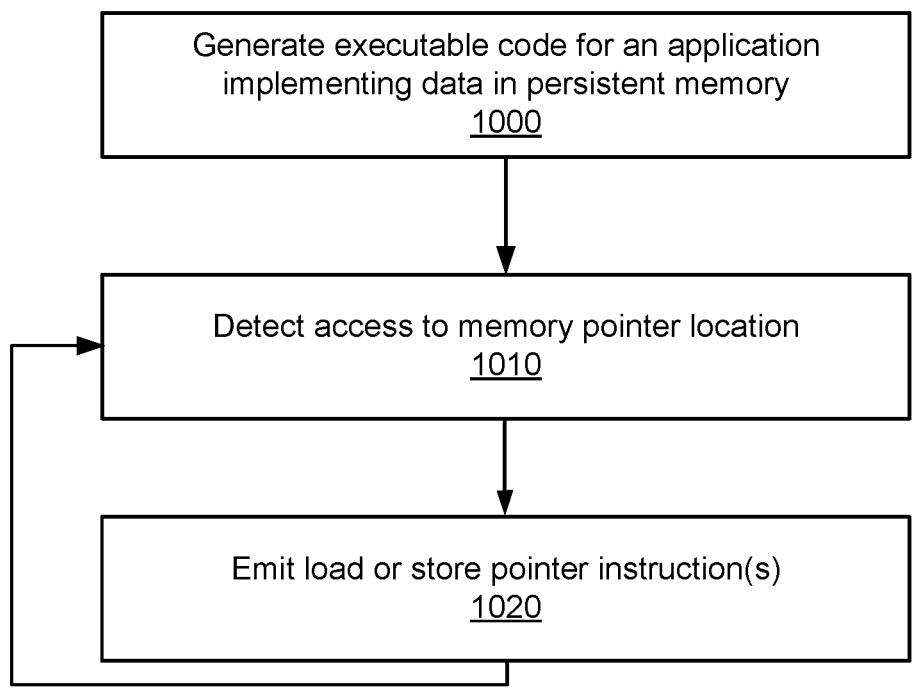
FIG. 10 is a flow diagram illustrating various embodiments of generating executable code supporting persistent data structures and position-independent addressing.

FIG. 10 is a flow diagram illustrating various embodiments of generating executable code supporting persistent data structures and position-independent addressing. The process begins at step 1000 where executable code for an application implementing persistent data structures using position-independent addressing may be generated.

During code generation, an access, either a read access or a write access, to a memory pointer location may be detected, in some embodiments. When the access is detected, as shown in 1010, pointer forms of either load or store instructions may be generated to implement the pointer access, depending on the type of access requested, as shown in 1020, in some embodiments. By emitting pointer forms of load or store instructions rather than traditional load or store instructions, the processor may signal a normalizing address unit, such as the normalizing address unit 113 as shown in FIG. 1, to normalize or de-normalize addresses to implement position-independent addressing modes. In some embodiments, these pointer forms of load or store instructions may be implemented as unique instructions as part of processor instruction set architecture (ISA) while in other embodiments the pointer form may be implemented as a Boolean operand for conventional load or store instructions. These various examples, however, are not intended to be limiting and any number of arrangements for these reserved values may be envisioned.

Once code is generated for the detected access, the process returns to step 1020 where additional pointer accesses may be detected.

Figure 11:
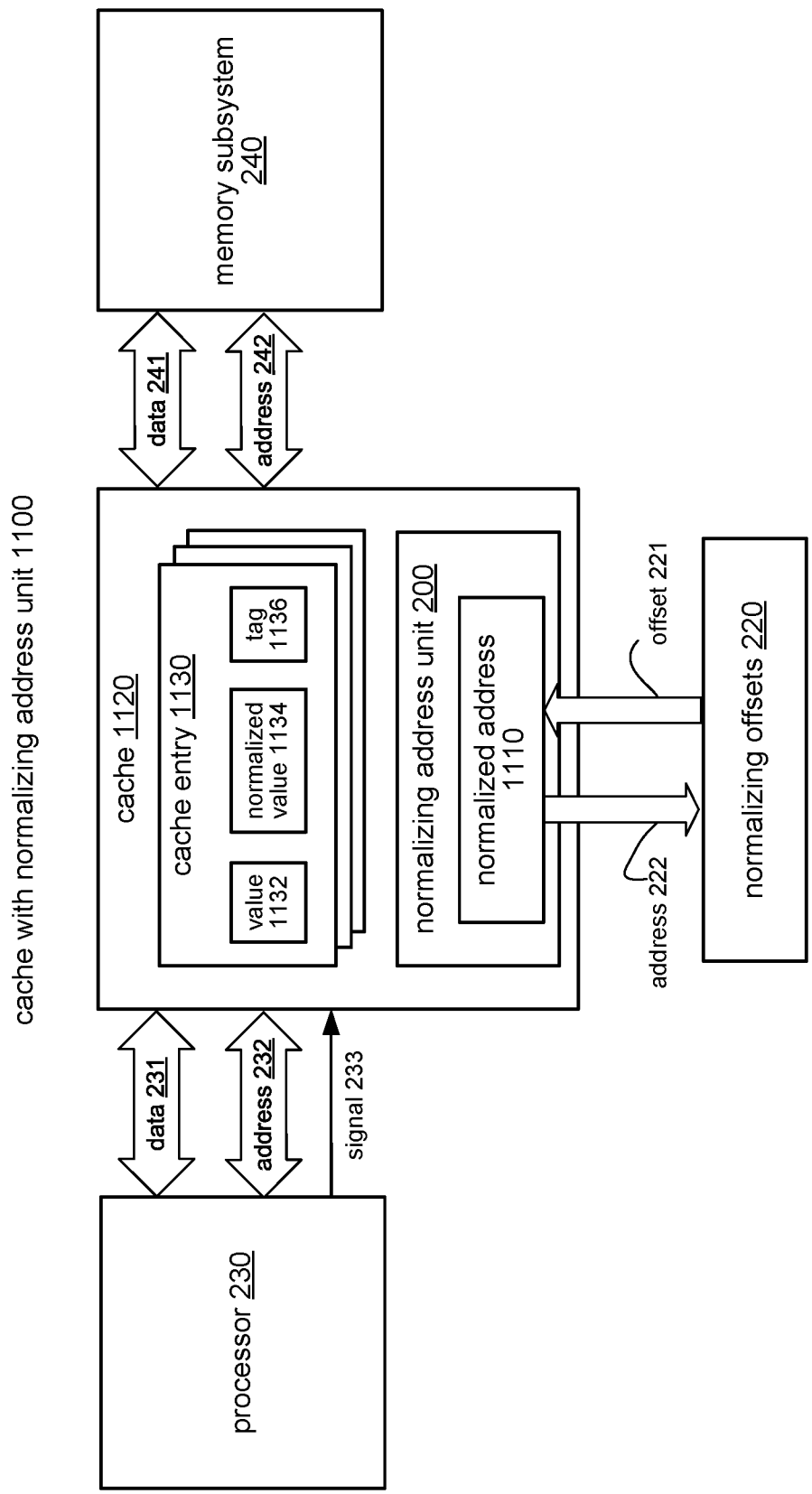
FIG. 11 is a block diagram illustrating an embodiment implementing a processor cache incorporating a normalizing address unit that supports position-independent addressing.

FIG. 11 is a block diagram illustrating an embodiment implementing a processor cache incorporating a normalizing address unit 1100 that supports position-independent addressing. A cache 1120 may reside between a processor 230 and a memory subsystem 240 and be coupled to, or incorporate, a normalizing address unit 200, such as the normalizing address unit 113 as shown in FIG. 1, with the cache 1120 transparently normalizing and de-normalizing memory addresses communicated over data buses 231 and 241. Memory locations storing pointers may be identified using memory addresses communicated over address buses 232 and 242, where the processor may indicate memory accesses to pointer values by asserting a true value on the pointer signal 233 while indicating memory accesses to non-pointer values by asserting a false value on the pointer signal 233.

The cache 1120 may include a number of cache entries, such as the cache entry 1130. Included in each cache entry 1130 may be a value 1132, a normalized value 1134 and a tag 1136. In some embodiments, the value 1132 and normalized value 1134 may reside in the same cache memory location with the tag 1136 indicating whether the value stored in the location is normalized or not normalized. In other embodiments, the value 1132 and normalized value 1134 may reside in different cache memory locations with the tag 1136 indicating a current state of the normalized value 1134. In addition, the tag 1136 may store information indicating if the cache entry 1130 contains a pointer value as indicated by the processor through signal 223.

The cache entry 1130 may store a value also stored in the memory subsystem 240 to enable lower latency access to frequently used memory locations, in various embodiments. In some embodiments, a cache entry may be preloaded, or prefetched, with data from the memory subsystem 240 in anticipation of future access by the processor 230. In this event, the cache may not know if the cache entry contains a pointer value that may require normalization.

The normalizing address unit 200 may contain an adder usable to normalize and de-normalize memory addresses. When a memory access of a pointer is performed that is stored in the cache entry 1130, as indicated by a true value asserted on the signal 233, the cache 1120 may employ the normalizing address unit 200 which may then activate the adder to add or subtract, from the value 1132, an offset 221 obtained from normalizing offset 220 using the address of the access communicated over the address bus 222 to compute a normalized address 1110. The cache may then store the normalized address 1110 in the normalized value 1134 and update the tag 1136 to indicate the availability of a normalized value 1134 for the cache entry 1130. In the event a memory access of a pointer is performed that is stored in the cache entry 1130, as indicated by a true value asserted on the signal 233, if the tag 1136 indicates the availability of a normalized value 1134 for the cache entry 1130, the cache 1120 may satisfy the memory access with the normalized value 1134, in some embodiments.

In some embodiments that store the value 1132 and normalized value 1134 in different cache memory locations, the cache 1120 may employ information, including the tag 1136 and additional information (not shown), to identify data stored in the cache entry 1130. In the case or read accesses from the processor 230, the cache 1120 may use this information to identify if the value for the access is contained in the value 1132 and if a normalized value for the access is contained in normalized value 1134. In some embodiments, write accesses from the processor 230, may update the normalized value 1134 and additionally update the value 1132 using the normalizing address unit 200. In other embodiments, write accesses from the processor 230 may update the normalized value 1134 and defer updates to the value 1132 to a later time. These various examples of write accesses, however, are not intended to be limiting and any number of implementations may be envisioned.

In embodiments that store the value 1132 and normalized value 1134 in a same cache memory location, the cache 1120 may maintain either a normalized or non-normalized value in the cache memory location. In these embodiments, cache preloads or prefetches may set the tag 1136 to indicate a non-normalized value while the signal 233 may be used to convert the value stored in the cache entry 1130 as required by the processor 230 to perform memory accesses. In these embodiments, write operations performed by the cache 1120 to the memory subsystem 240 may employ information in the tag 1136 to convert normalized values in the cache entry 1130 to non-normalized values to write to the memory subsystem 240. These various examples of write accesses, however, are not intended to be limiting and any number of implementations may be envisioned.

In some embodiments, the normalizing offsets 220 may be implemented in lookup tables such as page table (not shown) or other data structures of an MMU such as the MMU 114 as shown in FIG. 1. A common offset value for multiple normalized pointers may thus be shared for normalized pointers stored on a same memory page. In other embodiments, the normalizing offsets 220 may be implemented as a hardware lookup table or data structure, for example using a content addressable memory or a ternary content addressable memory. Using a content addressable memory, a default value may be defined returning a zero value for any address not found, allowing for the bypassing of the normalizing and de-normalizing operations for pointers, such as the absolute pointers 136 as shown in FIG. 1, which do not store normalized addresses. In still other embodiments, the normalizing offsets 220 may not store pre-determined offsets at all, but may simply reflect the address received over address bus 222 as the offset 221. While embodiments using this form of normalizing offsets 220 may result in all pointers being normalized and de-normalized, in some embodiments this may result in proper functioning of all memory pointers. These various examples of normalizing offsets 220, however, are not intended to be limiting and any number of implementations may be envisioned.

Some of the mechanisms described herein may be provided as a computer program product, or software, that may include a non-transitory, computer-readable storage medium having stored thereon instructions which may be used to program a computer system 1200 (or other electronic devices) to perform a process according to various embodiments. A computer-readable storage medium may include any mechanism for storing information in a form (e.g., software, processing application) readable by a machine (e.g., a computer). The machine-readable storage medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; electrical, or other types of medium suitable for storing program instructions. In addition, program instructions may be communicated using optical, acoustical or other form of propagated signal (e.g., carrier waves, infrared signals, digital signals, etc.)

In various embodiments, computer system 1200 may include one or more processors 1210a, 1210b-1210n; each may include multiple cores, any of which may be single-or multi-threaded. For example, multiple processor cores may be included in a single processor chip (e.g., a single processor 1210*a*), and multiple processor chips may be included in computer system 1200. Each of the processors 1210 may include a cache or a hierarchy of caches (not shown) in various embodiments. For example, each of the processor chips 1210 may include multiple L1 caches (e.g., one per processor core) and one or more other caches (which may be shared by the processor cores on a single processor).

Figure 12:
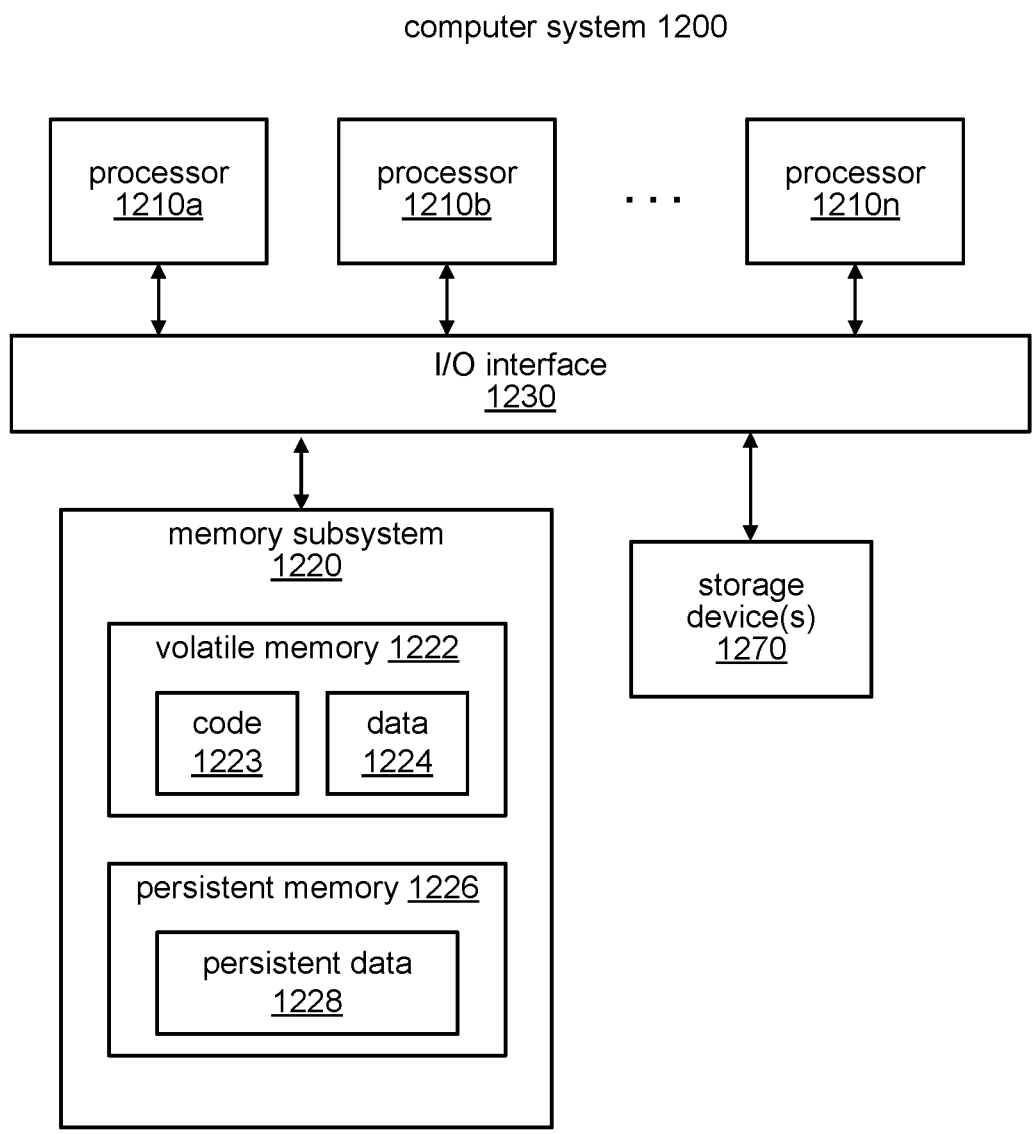
FIG. 12 is a block diagram illustrating one embodiment of a computing system that is configured to implement position-independent addressing modes, as described herein.

The computer system 1200 may also include one or more storage devices 1270 (e.g. optical storage, magnetic storage, hard drive, tape drive, solid state memory, etc.) and a memory subsystem 1220. The memory subsystem 1220 may further include one or more volatile memories (e.g., one or more of cache, SRAM, DRAM, RDRAM, EDO RAM, DDR RAM, SDRAM, Rambus RAM, EEPROM, etc.). In some embodiments, one or more of the storage device(s) 1270 may be implemented as a module on a memory bus (e.g., on I/O interface 1230) that is similar in form and/or function to a single in-line memory module (SIMM) or to a dual in-line memory module (DIMM). The memory subsystem 1220 may further include one or more byte-addressable persistent memories (PMEM), (e.g. Nonvolatile RAM (NVRAM), Intel Optane Persistent Memory, etc.) Various embodiments may include fewer or additional components not illustrated in FIG. 12 (e.g., video cards, audio cards, additional network interfaces, peripheral devices, a network interface such as an ATM interface, an Ethernet interface, a Frame Relay interface, etc.)

The one or more processors 1210, the storage device(s) 1270, and the memory subsystem 1220 may be coupled to the I/O interface 1230. The memory subsystem 1220 may contain application data 1224 and program code 1223 in a volatile memory 1222. Application data 1224 may contain various data structures while program code 1223 may be executable to implement one or more applications, shared libraries, and/or operating systems. The memory subsystem 1220 may further contain persistent data 1228 stored in the PMEM 1226 which may persist across system shutdowns and restarts, among other possible system events.

Program instructions 1225 may be encoded in a platform native binary, any interpreted language such as Java™ byte-code, or in any other language such as C/C++, the Java™ programming language, etc., or in any combination thereof. In various embodiments, applications, operating systems, and/or shared libraries may each be implemented in any of various programming languages or methods. For example, in one embodiment, operating system may be based on the Java™ programming language, while in other embodiments it may be written using the C or C++ programming languages. Similarly, applications may be written using the Java™ programming language, C, C++, or another programming language, according to various embodiments. Moreover, in some embodiments, applications, operating system, and/shared libraries may not be implemented using the same programming language. For example, applications may be C++ based, while shared libraries may be developed using C.

Although the embodiments above have been described in considerable detail, numerous variations and modifications will become apparent to those skilled in the art once the above disclosure is fully appreciated. For example, although many of the embodiments are described in terms of particular types of operations that support position-independent addressing of memory within applications that access data in persistent, it should be noted that the techniques and mechanisms disclosed herein for providing position-independent addressing may be applicable in other contexts in which applications access and/or operate on different types of data than those described in the examples herein. It is intended that the following claims be interpreted to embrace all such variations and modifications.

What is claimed:

1. A system, comprising:
   a memory storing a load instruction of an application, the load instruction indicating a position-independent addressing mode; and
   a processor different from the memory, the processor comprising a hardware lookup table that stores an offset for a source memory address and configured to execute the load instruction, wherein to execute the load instruction, the processor is configured in hardware circuitry to:
   load a normalized memory address from a location of the memory identified by the source memory address; and
   responsive to determining that the normalized memory address is different from a reserved value, the reserved value indicating an invalid memory address:
   obtain the offset for the source memory address from the hardware lookup table of the processor, the offset previously established by an operating system, different from the application, according to an allocation of a portion of the memory containing the source memory address;
   add the obtained offset to the normalized memory address to determine a particular memory address; and
   store the particular memory address in a destination location of the load instruction.

2. The system of claim 1, the memory further storing another load instruction to load another memory address from a normalized pointer, wherein the other load instruction identifies another source memory address, and wherein to execute the other load instruction, the processor is configured to:
   load another normalized memory address stored in the identified other source memory address;
   responsive to determining that the other normalized memory address matches the reserved value, the reserved value indicating an invalid memory address, store a memory address value indicating an invalid memory pointer in a destination location of the other load instruction.

3. The system of claim 1, the memory further storing a store instruction to store another memory address to a destination memory address, wherein the other memory address is associated with a normalized pointer, and wherein to execute the store instruction, the processor is configured to:
   responsive to determining that the normalized pointer is different from a memory address value indicating an invalid memory pointer:
   obtain another offset for the destination memory address, the other offset previously established according to another allocation of another portion of the memory containing the destination memory address;
   subtract the obtained other offset from the normalized pointer to generate the other memory address; and
   store the other memory address in a memory location identified by the destination memory address.

4. The system of claim 1, the memory further storing a store instruction to store another memory address to a destination memory address, wherein the other memory address is associated with a normalized pointer, and wherein to execute the store instruction, the processor is configured to:
  responsive to determining that the normalized pointer matches another reserved value indicating that the normalized pointer contains an invalid memory pointer:
    store the reserved value indicating an invalid memory address in a memory location identified by the normalized pointer.

5. The system of claim 1, wherein the destination location is identified in the load instruction.

6. The system of claim 1, wherein the reserved value indicating an invalid memory address is identified in the load instruction.

7. A method, comprising:
  executing, by a processor comprising a hardware lookup table that stores an offset for a source memory address and implementing a position-independent addressing mode, a load instruction of an application, the load instruction indicating the position-independent addressing mode, wherein the executing comprises:
    loading a normalized memory address from a location of a memory external to the processor and identified by the source memory address; and
    responsive to determining that the normalized memory address is different from a reserved value, the reserved value indicating an invalid memory address:
      obtaining the offset for the source memory address from the hardware lookup table of the processor, the offset previously established by an operating system, different from the application, according to an allocation of a portion of the memory containing the source memory address;
      adding the obtained offset to the normalized memory address to determine a particular memory address; and
      storing the particular memory address in a destination location of the load instruction.

8. The method of claim 7, further comprising:
  executing, by the processor, another load instruction to load another memory address from a normalized pointer, the other load instruction identifying another source memory address, and the executing of the other load instruction performing at least:
    loading another normalized memory address stored in the identified other source memory address; and
    responsive to determining that the other normalized memory address matches the reserved value, the reserved value indicating an invalid memory address, storing a memory address value indicating an invalid memory pointer in a destination location of the other load instruction.

9. The method of claim 7, further comprising:
  executing, by the processor, a store instruction to store another memory address of a to a destination memory address, the executing of the store instruction performing at least:
    responsive to determining that the normalized pointer is different from a memory address value indicating an invalid memory pointer:
      obtaining another offset for the destination memory address, the other offset previously established according to another allocation of another portion of the memory containing the destination memory address;
      subtracting the obtained other offset from the normalized pointer to generate the other memory address; and
      storing the other memory address in a memory location identified by the destination memory address.

10. The method of claim 7, further comprising:
  executing, by the processor, a store instruction to store another second memory address of a normalized pointer to a destination memory address, wherein the other memory address is associated with a normalized pointer, and the executing of the store instruction performing at least:
    responsive to determining that the normalized pointer matches another second reserved value indicating that the normalized pointer contains an invalid memory pointer:
      storing the reserved value indicating an invalid memory address in a memory location identified by the normalized pointer.

11. The method of claim 7, wherein the destination location is identified in the load instruction.

12. The method of claim 7, wherein the reserved value indicating an invalid memory address is identified in the load instruction.

13. The method of claim 7, wherein the reserved value indicating an invalid memory address is identified in an instruction set architecture associated with the processor.

14. One or more non-transitory computer-accessible storage media storing program instructions that when executed on or across one or more computing devices cause the one or more computing devices to perform:
  executing, by a processor comprising a hardware lookup table that stores an offset for a destination memory address and implementing a position-independent addressing mode, a store instruction of an application, the store instruction indicating the position-independent addressing mode, wherein the executing comprises:
    responsive to determining that a normalized pointer is different from a memory address value, the memory address value indicating an invalid memory pointer:
      obtaining the offset for the destination memory address from the hardware lookup table of the processor, the offset previously established by an operating system, different from the application, according to an allocation of a portion of a memory containing the destination memory address;
      subtracting the obtained offset from the normalized pointer to generate a normalized memory address; and
      storing the normalized memory address in a memory location external to the processor and identified by the destination memory address.

15. The one or more non-transitory computer-accessible storage media of claim 14 further storing program instructions that when executed on or across the one or more computing devices cause the one or more computing devices to perform:
  executing, by the processor, another store instruction to store another offset value of another normalized pointer to another second destination memory address, the executing of the other store instruction performing at least:

responsive to determining that the other normalized pointer matches another reserved value indicating that the other normalized pointer contains an invalid memory pointer:
    storing a reserved value indicating an invalid memory address in a memory location identified by the other second normalized pointer.

16. The one or more non-transitory computer-accessible storage media of claim 15, wherein the reserved value indicating an invalid memory address is identified in the other store instruction.

17. The one or more non-transitory computer-accessible storage media of claim 15, wherein the reserved value indicating an invalid memory address is identified in an instruction set architecture associated with the processor.

18. The one or more non-transitory computer-accessible storage media of claim 15 further storing program instructions that when executed on or across the one or more computing devices cause the one or more computing devices to perform:
    executing, by the processor, a load instruction to load another memory address from another normalized pointer, the load instruction identifying a source memory address, and the executing of the load instruction performing at least:
        loading a normalized memory address stored in the identified source memory address; and
        responsive to determining that the normalized memory address is different from the reserved value, the reserved value indicating an invalid memory address:
            obtaining another offset for the source memory address, the other offset previously established according to another allocation of another portion of the memory containing the source memory address;
            adding the obtained other offset to the normalized memory address to determine the other memory address; and
            storing the determined other memory address in a destination location of the load instruction.

19. The one or more non-transitory computer-accessible storage media of claim 18, wherein the destination location is identified in the load instruction.

20. The one or more non-transitory computer-accessible storage media of claim 15 further storing program instructions that when executed on or across the one or more computing devices cause the one or more computing devices to perform:
    executing, by the processor, a load instruction to load another memory address from another normalized pointer, the load instruction identifying a source memory address, and the executing of the load instruction performing at least:
        loading a normalized memory address stored in the identified source memory address; and
        responsive to determining that the normalized memory address matches the reserved value, the reserved value indicating an invalid memory address, generating an exception indicating that the normalized memory address is invalid.

* * * * *

UNITED STATES PATENT AND TRADEMARK OFFICE
CERTIFICATE OF CORRECTION

PATENT NO. : 12,204,907 B2
APPLICATION NO. : 17/335945
DATED : January 21, 2025
INVENTOR(S) : Wolczko Page 1 of 1

It is certified that error appears in the above-identified patent and that said Letters Patent is hereby corrected as shown below:

In the Claims

In Column 15, Line 57, in Claim 9, after "address" delete "of a".

In Column 15, Line 58, in Claim 9, after "address," insert -- wherein the other memory address is associated with a normalized pointer, and --, therefor.

In Column 16, Line 9, in Claim 10, after "another" delete "second".

In Column 16, Line 10-11, in Claim 10, after "address" delete "of a normalized pointer".

In Column 16, Line 16, in Claim 10, after "another" delete "second".

In Column 16, Line 65, in Claim 15, after "another" delete "second".

In Column 17, Line 7, in Claim 15, after "other" delete "second".

Signed and Sealed this
Eighth Day of April, 2025

Coke Morgan Stewart
*Acting Director of the United States Patent and Trademark Office*